United States Patent
Suzuki et al.

(10) Patent No.: US 10,994,214 B2
(45) Date of Patent: May 4, 2021

(54) CONTENT SHARING SUPPORT DEVICE AND ONLINE SERVICE PROVIDING DEVICE

(71) Applicant: DWANGO Co., Ltd., Tokyo (JP)

(72) Inventors: Shinnosuke Suzuki, Tokyo (JP); Shohei Moriyama, Tokyo (JP)

(73) Assignee: DWANGO Co., Ltd., Tokyo (JP)

(*) Notice: Subject to any disclaimer, the term of this patent is extended or adjusted under 35 U.S.C. 154(b) by 0 days.

(21) Appl. No.: 16/497,097

(22) PCT Filed: Aug. 31, 2018

(86) PCT No.: PCT/JP2018/032365
§ 371 (c)(1),
(2) Date: Sep. 24, 2019

(87) PCT Pub. No.: WO2019/045050
PCT Pub. Date: Mar. 7, 2019

(65) Prior Publication Data
US 2020/0376394 A1 Dec. 3, 2020

(30) Foreign Application Priority Data
Sep. 1, 2017 (JP) .............................. JP2017-168251

(51) Int. Cl.
*A63F 13/85* (2014.01)
*A63F 13/35* (2014.01)

(52) U.S. Cl.
CPC .............. *A63F 13/85* (2014.09); *A63F 13/35* (2014.09); *A63F 2300/572* (2013.01)

(58) Field of Classification Search
CPC ..... A63F 13/85; A63F 13/35; A63F 2300/572
(Continued)

(56) References Cited

U.S. PATENT DOCUMENTS

| 5,558,339 A * | 9/1996 | Perlman | ................. A63F 13/12 463/42 |
| 8,827,791 B2 * | 9/2014 | Doorgeest | ............. A63F 3/0645 463/16 |

(Continued)

FOREIGN PATENT DOCUMENTS

| JP | 2015216965 A | 12/2015 |
| JP | 2015217297 A | 12/2015 |

(Continued)

OTHER PUBLICATIONS

Translation of International Search Report and Written Opinion dated Sep. 25, 2018 in corresponding application No. PCT/JP2018/032365; 7 pgs.

(Continued)

Primary Examiner — Michael A Cuff
(74) Attorney, Agent, or Firm — Maier & Maier, PLLC (57) ABSTRACT

According to a first aspect of the present invention, a content sharing support device includes a content receiving unit, a content transmitting unit, a first reaction receiving unit and a first reaction transmitting unit. The content receiving unit receives content from an online service providing device. The content transmitting unit transmits the content to a first terminal connected to the content sharing support device. The first reaction receiving unit receives a first reaction relating to the content from the first terminal. The first reaction transmitting unit transmits the first reaction to the online service providing device.

11 Claims, 7 Drawing Sheets

(58) Field of Classification Search
USPC .......................................................... 463/42
See application file for complete search history.

(56) References Cited

U.S. PATENT DOCUMENTS

| | | | |
|---|---|---|---|
| 2005/0064926 A1* | 3/2005 | Walker | G07F 17/3237 463/16 |
| 2006/0251383 A1* | 11/2006 | Vronay | G11B 27/034 386/242 |
| 2008/0043038 A1* | 2/2008 | Frydman | H04N 21/21805 345/632 |
| 2008/0274798 A1* | 11/2008 | Walker | G07F 17/32 463/25 |
| 2009/0094630 A1* | 4/2009 | Brown | H04H 60/33 725/12 |
| 2009/0117969 A1* | 5/2009 | Englman | G07F 17/3276 463/20 |
| 2010/0160038 A1* | 6/2010 | Youm | A63F 13/497 463/29 |
| 2010/0210351 A1* | 8/2010 | Berman | G07F 17/3246 463/25 |
| 2012/0030714 A1* | 2/2012 | Sweatt, III | H04N 21/8586 725/54 |
| 2012/0102080 A1* | 4/2012 | Kirihata | G06F 16/1774 707/831 |
| 2016/0162172 A1* | 6/2016 | Rathod | H04L 67/10 715/747 |
| 2019/0037173 A1* | 1/2019 | Lee | H04W 76/15 |

FOREIGN PATENT DOCUMENTS

| | | |
|---|---|---|
| JP | 2016024536 A | 2/2016 |
| JP | 2016-45960 A | 4/2016 |

OTHER PUBLICATIONS

Notice of Reasons for Refusal dated Feb. 13, 2018 in corresponding application No. JP2017168251; 8 pgs.
Decision to Grant a Patent dated Apr. 10, 2018 in corresponding application No. JP2017168251; 5 pgs.

* cited by examiner

CONTENT SHARING SUPPORT DEVICE AND ONLINE SERVICE PROVIDING DEVICE

FIELD

The present invention relates to content provided in an online service.

BACKGROUND

In the related art, for example, in an online game, update of a game program, an in-game event, server maintenance, and the like, a user may be notified of information relating to the game. In addition, some race games are provided with a function of sharing a play moving image or play data relating to getting of a high score between users.

As described above, in the online game, a business operator may provide a user with useful information or content for exciting the game.

The useful information or the content for exciting the game is basically provided at the time of game play. That is, it is difficult for a person other than a user who actually plays a game online to know which event happens in the game and which content is provided. In-game events and content may be a motivation for a non-user to purchase the game, a motivation for a new user to register the game, and a motivation for a user who has not played the game for a long time to replay the game. Here, the business operator utilizes advertisement on mass media or the Internet to make the non-user or the users to aware of the in-game events and the presence of the content.

As means for making a notification for in-game information in the real world, some puzzle games have a function of notifying user's friends of getting of a high score when the user gets the high score by using a communication application (for example, refer to Literature: "[TSUM TSUM] what happens when pushing a "notification" button of a high score?", [online], [retrieved on Jun. 21, 2017], Internet <URL: http://line TSUM TSUM.biz/category6/entry42.html>

In addition, JP-A-2016-45960 discloses a configuration in which a content providing server provides various kinds of content such as news, a product, a service, and a game item to a device ([0020]), and a configuration in which common interest content determined on the basis of user's interest category information ([0032]) are transmitted to an instant message server ([0023]) providing a service of an application relating to a chatting room ([0025]), and is transmitted to a device ([0090]).

SUMMARY

As a channel for giving a notification of presence of in-game events and content, online news is also exemplified. However, the online news deals with enormous news articles daily, and thus there is a possibility that published news articles may be buried in other news articles before attracting an attention of many readers.

In some online news, a reader's reaction relating to a new article can be shared. Examples of the reaction include a comment on the news article, an expression of a positive position or a negative position on the comment, and the like. A news article with a large amount of posted comments is likely to attract interest of readers, and a transmission effect of the article content is also expected to be high.

Communication between readers of the same news article may occur through comments. However, typically, the comments on the news article can be viewed through a service of online news for which the comments are actually posted. That is, comments posted to a news article in any online news service cannot be viewed by readers of the same news article in another online news service.

An object of the invention is to share content and/or a reaction relating to the content between a plurality of different online service systems.

According to a first aspect of the invention, there is provided a content sharing support device including a content receiving unit, a content transmitting unit, a first reaction receiving unit, and a first reaction transmitting unit. The content receiving unit receives content from an online service providing device. The content transmitting unit transmits the content to a first terminal connected to the content sharing support device. The first reaction receiving unit receives a first reaction relating to the content from the first terminal. The first reaction transmitting unit transmits the first reaction to the online service providing device.

According to a second aspect of the invention, there is provided a content sharing support device including a content receiving unit and a content transmitting unit. The content receiving unit receives content from a first online service providing device. The content transmitting unit transmits the content to a second online service providing device different from the first online service providing device.

According to a third aspect of the invention, there is provided an online service providing device including a service providing unit, a first content transmitting unit, a second content transmitting unit, a first reaction receiving unit, and a first reaction transmitting unit. The service providing unit provides an online service to a first terminal connected to the online service providing device. The first content transmitting unit transmits content to the first terminal. The second content transmitting unit transmits the content to another online service providing device or a content sharing support device that relays the content to the other online service providing device. The first reaction receiving unit receives a first reaction relating to the content from the other online service providing device or the content sharing support device. The first reaction transmitting unit transmits the first reaction to the first terminal. The first reaction originates from a second terminal connected to the other online service providing device.

According to the invention, a plurality of different online service systems can share content and/or a reaction relating to the content.

DETAILED DESCRIPTION

Hereinafter, an embodiment will be described with reference to the accompanying drawings. Note that, hereinafter, the same or similar reference numeral will be given to the element which same as or similar to the element already described, and redundant description will be basically omitted. For example, in a case where a plurality of the same or similar elements exist, a common reference numeral may be used to explain respective elements without distinction, and branch reference numerals in addition to the common reference numeral may be used to explain the respective elements with distinction.

Embodiment

A content sharing system according to an embodiment realizes sharing of content data (hereinafter, simply referred to as "content") between a plurality of online service systems. An online service providing device (server) that is the center of the plurality of online service systems is connected to a content sharing support device that becomes a hub of content. For example, the online service providing device provides a terminal with an online service such as an online game and online news. The content sharing support device acquires content from one online service providing device and transmits the content to another online service providing device. According to this, a plurality of the online service providing devices can share the content. Note that, the content sharing support device may have a function as the online service providing device. That is, the content sharing support device may transmit content to a terminal that is connected to a host device while functioning as a hub of the content.

For example, the content is news content. For example, the news content may include a news article relating to an online game. Examples of the online game include massively multiplayer online role playing game (MMORPG), first person shooter (FPS), third person shooter (TPS), fighting, action, sports, a table, a race, and the like. The news article may deal with various events such as notification of a large update, particularly, notification of a special event such as "a collaboration event with ○○", "a player A scored tens of thousands!", "a team B has captured any map", "a player C has died", "a boss D has defeated 1000 teams in total", and the like which are often seen in a social networking service (SNS)-based game. The content is not limited to the news content, and may be, for example, a moving image, a still image, a 3D model, a voice, a text, and the like. In addition, the content is not limited to content that is stored in advance, and may be content that is delivered in real time as in a live broadcast moving image.

When the content sharing support device allows the content to be shared between a plurality of online service systems, for example, a user of another online service system can view a news article that is delivered in an online game. According to this, an online service system that is a source of the content can make a virtual advertisement of a service provided by a host system to the user of the other online service system, and can stimulate interest of the user and anticipate use of the host system. In addition, for example, when the user of the other online service system can browse a news article dealing with a specific player, activity of the player can be known not only in the game but also outside the game. According to this, it is easy to improve or maintain motivation for the player to continuously play the game, and various real-world events accompanying an improvement of a player's name recognition may occur. For example, there is a possibility that the player may change to a game live player or a pro gamer, or the player may be invited to a tournament, and the like. On the other hand, as another online service system, there is an advantage that the deliverable content can be increased at low cost.

In addition, the content sharing system may set reaction data (hereinafter, simply referred to as "reaction") relating to the content as a sharing target in addition to the content. The reaction relating to the content may include a reaction on the content and a reaction on the reaction. Examples of the reaction on the content include a comment on the content, an expression of a positive position or a negative position on the content, and the like. Examples of the reaction on the reaction include a comment on the comment, expression of a positive position or a negative position on the comment, and the like.

When the reaction is shared between a plurality of online service systems, it is possible to diversify content that can be delivered to a terminal by respective online service system, and it is possible to provide a more interesting online service to the user. In addition, communication between users of different online service systems is realized through the reaction. Note that, sharing of the reaction may be performed in a non-synchronous manner, or may be performed in a synchronous manner to further activate the communication. That is, when a terminal transmits a reaction to an online service providing device, the reaction may be transmitted instantly to a terminal connected to the online service providing device, and the content sharing support device, and the reaction may be transmitted from the content sharing support device to another online service providing device and a terminal connected to the other online service providing device. In the synchronous sharing of the reaction, a communication load is large, but there is an advantage that communication between users is easily established.

Figure 1:
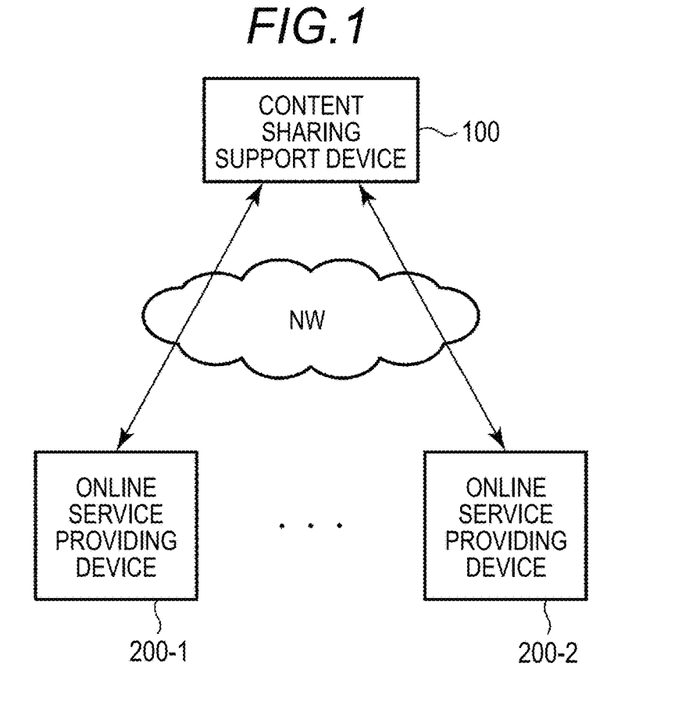
FIG. 1 is a block diagram illustrating a content sharing system according to an embodiment.

As illustrated in FIG. 1, the content sharing system according to the embodiment includes a content sharing support device 100, and online service providing devices 200-1 and 200-2. The respective online service providing devices 200 are connected to the content sharing support device 100 through a network. Note that, the number of the online service providing devices 200 are set to two for simplification, but may be three or greater. In addition, the content sharing support device 100 may function as one of the online service providing devices 200. That is, the content sharing support device 100 may transmit and receive content and/or a reaction to and from a terminal that is connected to the host device.

The content sharing support device 100 acquires content from any one of the online service providing devices 200. The content sharing support device 100 transmits the acquired content to another online service providing device 200.

In addition, the content sharing support device 100 acquires a reaction relating to shared content, that is, a reaction on the content and/or a reaction on the reaction from the online service providing device 200. The content sharing support device 100 transmits the acquired reaction to another online service providing device 200.

Figure 2:
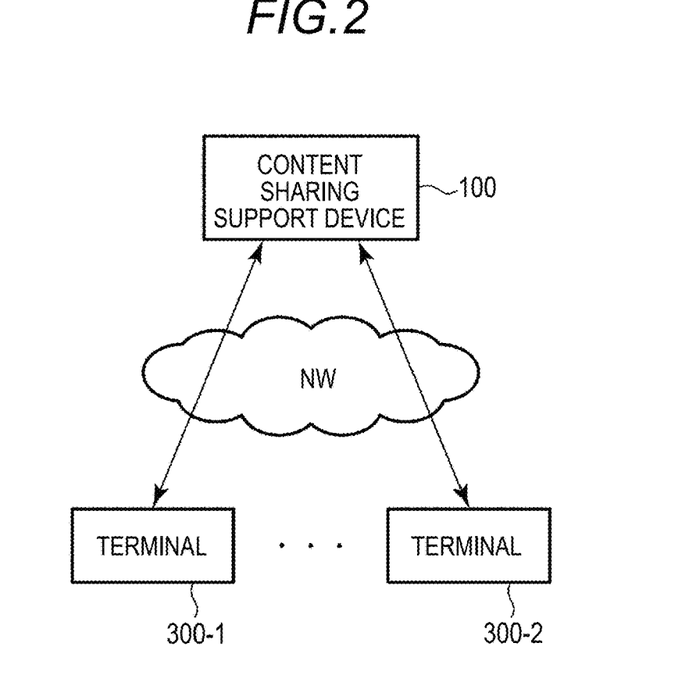
FIG. 2 is a block diagram illustrating an online service providing system with focus given to a content sharing support device in FIG. 1.

In addition, the content sharing support device 100 can function as one of the online service providing devices 200. Specifically, as illustrated in FIG. 2, the content sharing support device 100 can form an online service providing system. The online service providing system includes the content sharing support device 100 and terminals 300-1 and 300-2. Each of the terminals 300 is connected to the content sharing support device 100 through a network. Note that, the number of the terminals 300 is set to two for simplification, but may be three or greater or one or less.

The content sharing support device 100 transmits content and/or a reaction acquired from any one of the online service providing devices 200 to the reaction terminals 300. In addition, the content sharing support device 100 receives a reaction relating to the content from the terminal 300. The content sharing support device 100 transmits the reaction to another terminal 300 and/or another online service providing device 200.

Note that, the content sharing support device 100 may set content created by the content sharing support device 100 or content received from the terminal 300 as a sharing target without limitation to the content acquired from the online service providing device 200. For example, the content sharing support device 100 may be a moving image sharing server, and may transmit moving image content posted by the terminal 300 to not only the terminal 300 but also the online service providing device 200.

Figure 3:
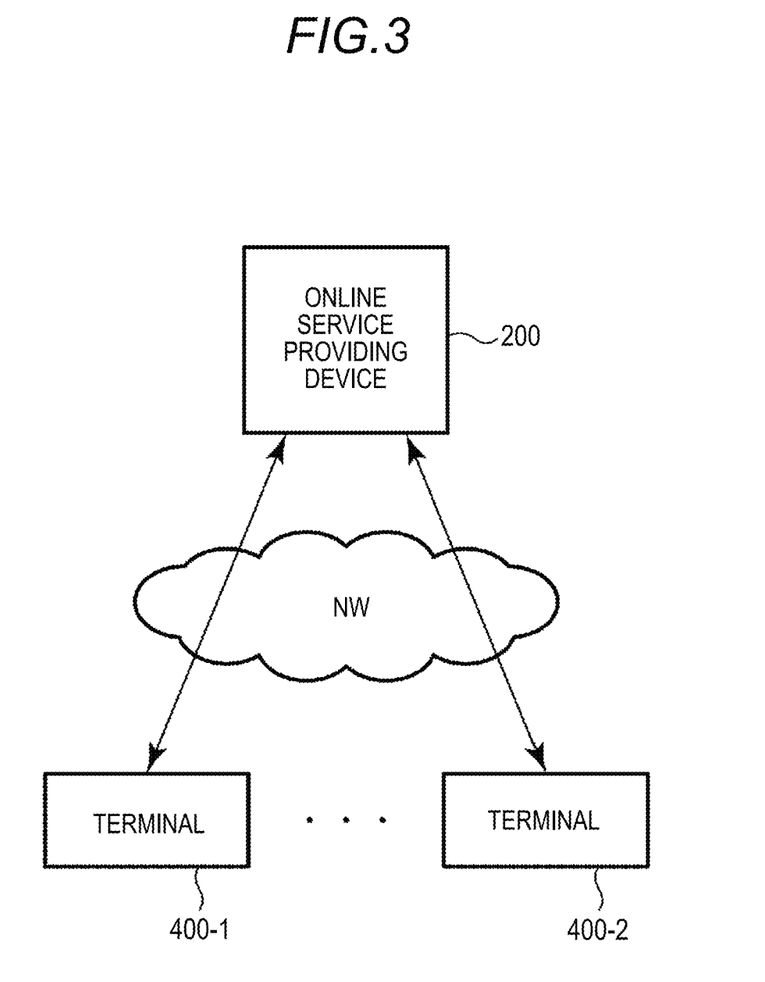
FIG. 3 is a block diagram illustrating an online service providing system with focus given to an online service providing device in FIG. 1.

In addition, as illustrated in FIG. 3, the online service providing device 200 may form an online service providing system. For example, the online service providing system may be an online game system, but there is no limitation thereto. The online service providing system includes the online service providing device 200 and terminals 400-1 and 400-2. The terminals 400 are connected to the online service providing device 200 through a network. Note that, the number of terminals 400 is set to two for simplification, but may be three or greater or one or less.

The online service providing device 200 transmits content created by the online service providing device 200, content and/or a reaction received from each of the terminals 400, or content and/or a reaction acquired from the content sharing support device 100 to the terminal 400. In addition, the online service providing device 200 receives a reaction relating to the content from the terminal 400. The online service providing device 200 transmits the reaction to another terminal 400 and/or the content sharing support device 100.

Hereinafter, description will be sequentially given of a configuration and an operation of the content sharing support device 100 and the online service providing device 200 in FIG. 1 with reference to the accompanying drawings.

First, a configuration example of the content sharing support device 100 will be described. For example, the content sharing support device 100 is a server computer, and includes a processor that performs reading/writing of content and a reaction, communication control, and the like, and a memory that temporarily stores a program that is executed by the processor to realize the process, data that is used by the processor, and the like.

In addition, the content sharing support device 100 can use a communication device for connection to a network, and an auxiliary storage device that stores large-capacity data. The communication device and the auxiliary storage device may be embedded in the content sharing support device 100 or may be externally attached to the content sharing support device 100.

The communication device performs communication with the online service providing device 200 or the terminal 300 through a network. For example, the communication device receives content and/or a reaction from the online service providing device 200, receives a reaction from the terminal 300, transmits the content and/or the reaction to the online service providing device 200, or transmits the content and/or the reaction to the terminal 300.

For example, the auxiliary storage device stores content and/or a reaction. For example, it is preferable that the auxiliary storage device is a nonvolatile storage medium such as a hard disk drive (HDD) and a solid-state drive (SSD). The auxiliary storage device may be a file server that is connected to the content sharing support device 100 through a network.

Figure 4:
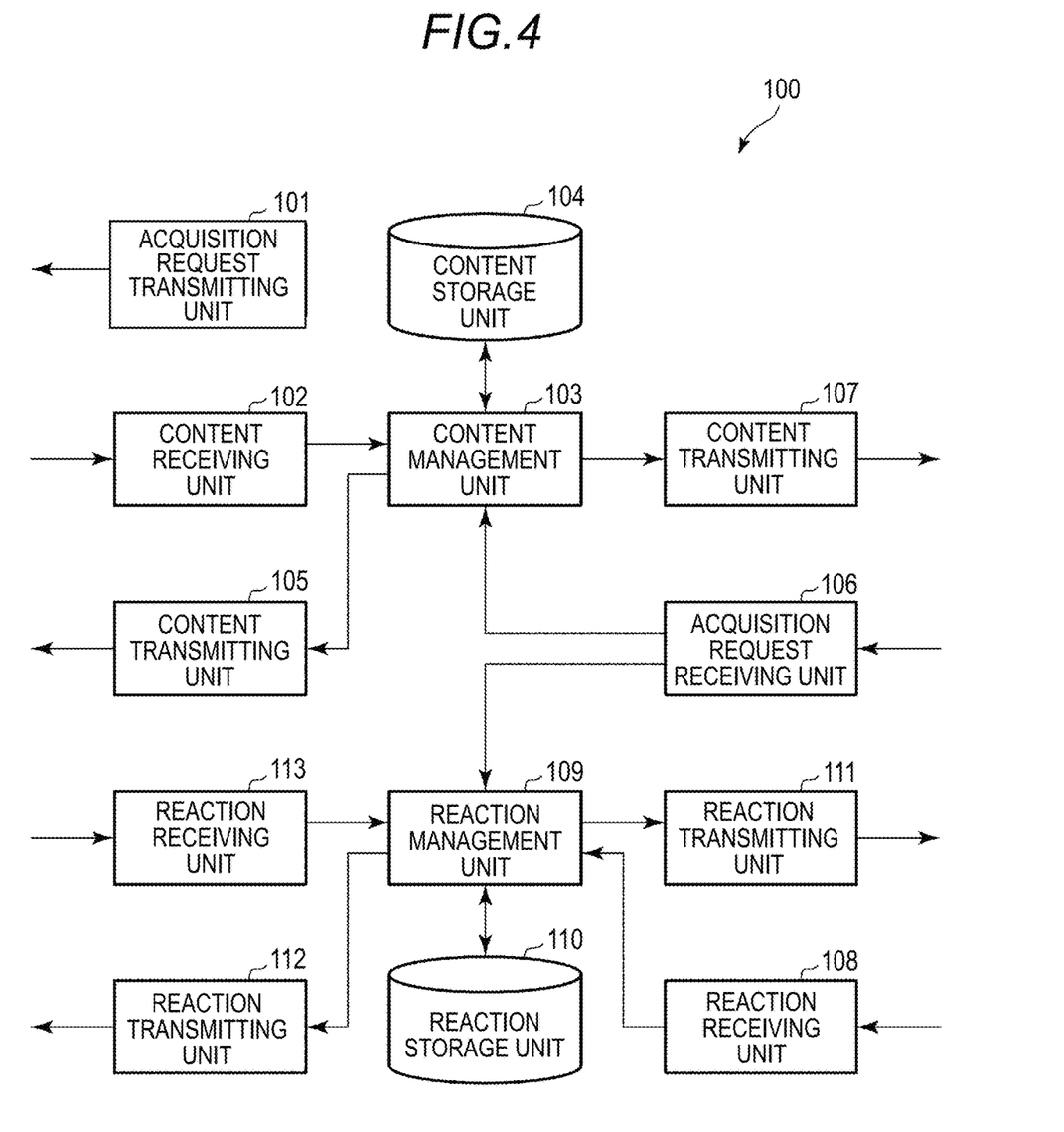
FIG. 4 is a block diagram illustrating a configuration of the content sharing support device in FIG. 1.

Next, the configuration example of the content sharing support device 100 will be continuously described with reference to FIG. 4. The content sharing support device 100 in FIG. 4 includes an acquisition request transmitting unit 101, a content receiving unit 102, a content management unit 103, a content storage unit 104, a content transmitting unit 105, an acquisition request receiving unit 106, a content transmitting unit 107, a reaction receiving unit 108, a reaction management unit 109, a reaction storage unit 110, a reaction transmitting unit 111, a reaction transmitting unit 112, and a reaction receiving unit 113.

The acquisition request transmitting unit 101 transmits an acquisition request for content and/or a reaction to the online service providing device 200 through a network. The acquisition request for the content and/or the reaction may be transmitted by setting satisfaction of certain conditions, for example, arrival of periodically determined transmission timing as a trigger. The acquisition request transmitting unit 101 may be the above-described communication device or may be an interface with the communication device.

The content receiving unit 102 receives content from the online service providing device 200 through a network, and transmits the content to the content management unit 103. For example, the online service providing device 200 may transmit the content to the content sharing support device 100 by setting reception of the acquisition request for content transmitted form the acquisition request transmitting unit 101 or satisfaction of certain conditions as a trigger. The content receiving unit 102 may be the above-described communication device or an interface with the communication device.

The content management unit 103 may be the above-described processor and memory. The content management unit 103 receives the content from the content receiving unit 102, and stores the content in the content storage unit 104.

In addition, the content management unit 103 reads out the content stored in the content storage unit 104, and transmits the content to the content transmitting unit 105 for transmission to another online service providing device 200 different from a transmission source of the content. This operation may be performed by setting reception of an acquisition request from the online service providing device 200 desiring to receive the content as a trigger, or may be automatically performed after storing the content in the content storage unit 104.

When performing the operation, content originating from the content sharing support device 100 and/or the online service providing device 200 may be shared by another online service providing device 200.

In addition, when receiving the acquisition request for content from the acquisition request receiving unit 106, the content management unit 103 reads out the content that is a target of the acquisition request from the content storage unit 104, and transmits the content to the content transmitting unit 107 for transmission to the terminal 300 that is a transmission source of the acquisition request.

When performing the operation, the terminal 300 can share the content originating from the online service providing device 200. Note that, the operation may be performed by setting satisfaction of conditions different from reception of the acquisition request as a trigger.

For example, when a target of acquisition request for content is set to the latest ten news articles, the content management unit 103 may read out the latest ten news articles regardless of an online service system that is a source of the news articles, and may transmit the news articles to the content transmitting unit 107. According to this, the terminal 300 can display news articles of which sources are different from each other on the same time line.

The content storage unit 104 receives content from the content management unit 103, and stores the content. The content may be read out by the content management unit 103 to be transmitted to an online service providing device 200 different from a transmission source of the content or the terminal 300. The content storage unit 104 may be the above-described auxiliary storage device or an interface with the auxiliary storage device.

The content transmitting unit 105 receives the content from the content management unit 103. The content transmitting unit 105 transmits the content to an online service providing device 200 different from a transmission source of the content through a network. The content transmitting unit 105 may be the above-described communication device or an interface with the communication device.

The acquisition request receiving unit 106 receives acquisition request for content and/or a reaction from the terminal 300 through a network. The acquisition request receiving unit 106 transmits the acquisition request for content to the content management unit 103, and transmits the acquisition request for a reaction to the reaction management unit 109. The acquisition request receiving unit 106 may be the above-described communication device or an interface with the communication device.

The content transmitting unit 107 receives content from the content management unit 103. The content transmitting unit 107 transmits the content to the terminal 300 through a network. The content transmitting unit 107 may be the above-described communication device or an interface with the communication device.

The reaction receiving unit 108 receives a reaction relating to the content from the terminal 300 that has transmitted the content. The reaction receiving unit 108 transmits the reaction to the reaction management unit 109. The reaction receiving unit 108 may be the above-described communication device or an interface with the communication device.

The reaction management unit 109 may be above-described processor or memory. The reaction management unit 109 receives the reaction from the reaction receiving unit 108, and stores the reaction in the reaction storage unit 110.

In addition, when receiving the acquisition request for a reaction from the acquisition request receiving unit 106, the reaction management unit 109 reads out a reaction that is a target of the acquisition request from the reaction storage unit 110, and transmits the reaction to the reaction transmitting unit 111 for transmission to the terminal 300 that is a transmission source of the acquisition request.

When performing the operation, the terminal 300 can share the reaction originating from the terminal 400 that is connected to the online service providing device 200. Note that, the operation may be performed by setting satisfaction of conditions different from reception of the acquisition request as a trigger.

In addition, the reaction management unit 109 reads out the reaction stored in the reaction storage unit 110, and transmits the reaction to the reaction transmitting unit 112 for transmission to the online service providing device 200. Note that, a destination of the reaction may include the online service providing device 200 that is a transmission source of the content correlated with the reaction. This operation may be performed by setting reception of an acquisition request from the online service providing device 200 desiring to receive the reaction as a trigger, or may be automatically performed after storing the reaction in the reaction storage unit 110.

When performing the operation, a reaction originating from the terminal 300 and/or the terminal 400 connected to the content sharing support device 100 and/or the online service providing device 200 can be shared by a terminal 400 connected to another online service providing device 200.

The reaction storage unit 110 receives the reaction from the reaction management unit 109 and stores the reaction. The reaction may be read out by the reaction management unit 109 to be transmitted to the online service providing device 200 or the terminal 300. The reaction storage unit 110 may be the above-described auxiliary storage device or an interface with the auxiliary storage device.

The reaction transmitting unit 111 receives the reaction from the reaction management unit 109. The reaction transmitting unit 111 transmits the reaction to the terminal 300 through a network. The reaction transmitting unit 111 may be the above-described communication device or an interface with the communication device.

The reaction transmitting unit 112 receives the reaction from the reaction management unit 109. The reaction transmitting unit 112 transmits the reaction to the online service providing device 200 through a network. The reaction transmitting unit 112 may be the above-described communication device or an interface with the communication device.

The reaction receiving unit 113 receives the reaction from the online service providing device 200 through a network, and transmits the reaction to the reaction management unit 109. For example, the online service providing device 200 may transmit the reaction to the content sharing support device 100 by setting reception of the acquisition request for a reaction transmitted from the acquisition request transmitting unit 101 or satisfaction of certain conditions as a trigger. The reaction receiving unit 113 may be the above-described communication device or an interface with the communication device.

Next, a configuration example of the online service providing device 200 will be described. For example, the online service providing device 200 is a server computer, and includes a processor that performs providing of an online serve, reading/writing of content and a reaction, communication control, and the like, and a memory that temporarily stores a program that is executed by the processor to realize the process, data that is used by the processor, and the like.

In addition, the online service providing device 200 can use a communication device for connection to a network, and an auxiliary storage device that stores large-capacity data. The communication device and the auxiliary storage device may be embedded in the online service providing device 200 or may be externally attached to the online service providing device 200.

The communication device performs communication with the content sharing support device 100 or the terminal 400 through a network. For example, the communication device receives content and/or a reaction from the content sharing support device 100, receives a reaction from the terminal 400, transmits the content and/or the reaction to the content sharing support device 100, or transmits the content and/or the reaction to the terminal 400.

For example, the auxiliary storage device stores content and/or a reaction. For example, it is preferable that the auxiliary storage device is a nonvolatile storage medium such as a hard disk drive (HDD) and a solid-state drive (SSD). The auxiliary storage device may be a file server that is connected to the online service providing device 200 through a network.

Figure 5:
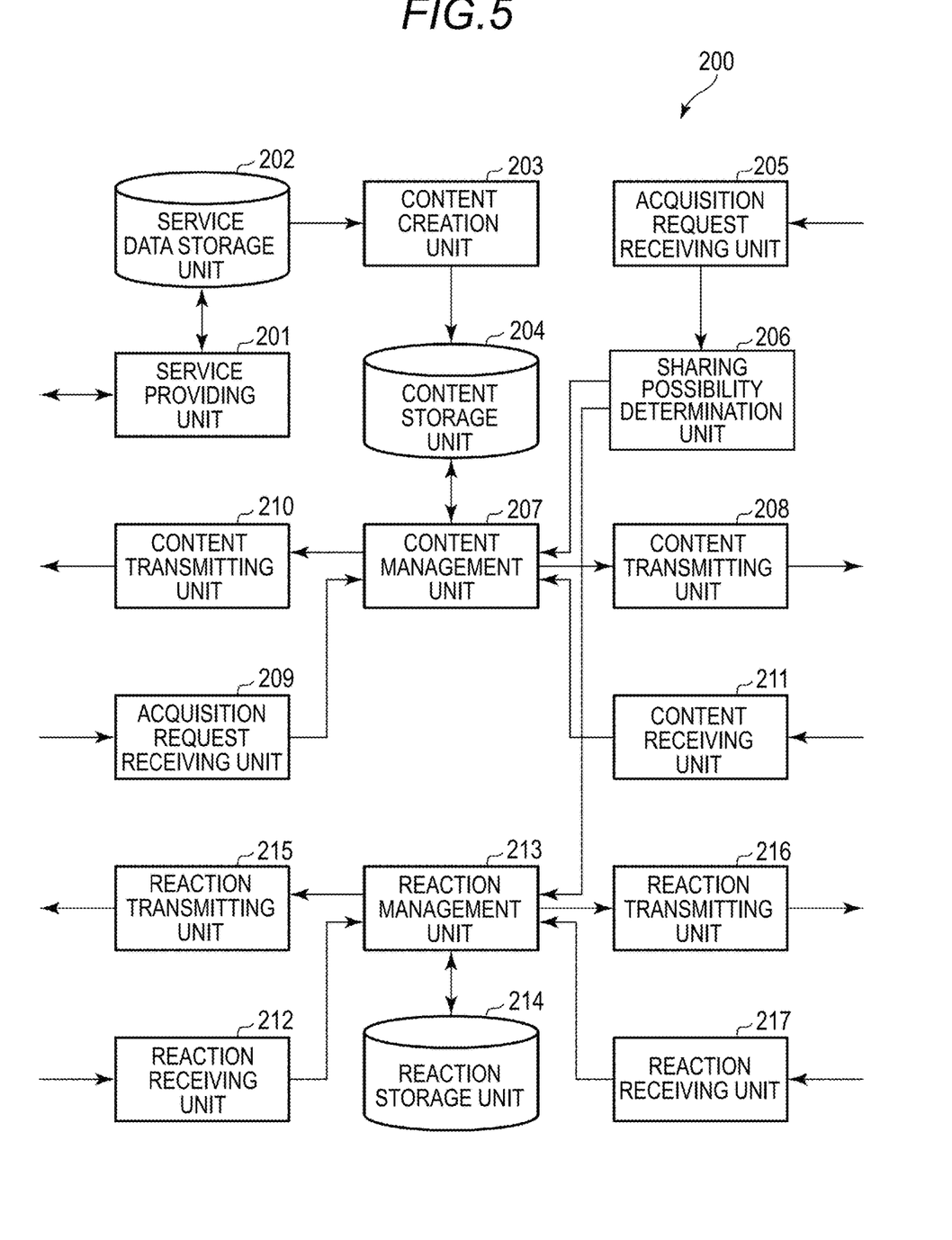
FIG. 5 is a block diagram illustrating a configuration of the online service providing device in FIG. 1.

Next, the configuration example of the online service providing device 200 will be continuously described with reference to FIG. 5. The online service providing device 200 in FIG. 5 includes a service providing unit 201, a service data storage unit 202, a content creation unit 203, a content storage unit 204, an acquisition request receiving unit 205, a sharing possibility determination unit 206, a content management unit 207, a content transmitting unit 208, an acquisition request receiving unit 209, a content transmitting unit 210, a content receiving unit 211, a reaction receiving unit 212, a reaction management unit 213, a reaction storage unit 214, a reaction transmitting unit 215, a reaction transmitting unit 216, and a reaction receiving unit 217.

The service providing unit 201 provides an online service to the terminal 400. For example, the online service may be an online game, online news, content sharing, or the like. The service providing unit 201 reads out an application necessary for providing the online service, content, or the like from the service data storage unit 202, and transmits the application, the content, or the like to the terminal 400 through a network. In addition, the service providing unit 201 receives, for example, play data of an online game from the terminal 400, and stores the play data in the service data storage unit 202. In addition, the service providing unit 201 receives, for example, operation data of the online game from the terminal 400, and controls progress of the online game. The service providing unit 201 may be a combination of the above-described processor and memory, and the above-described communication device and an interface thereof.

The service data storage unit 202 retains data relating to the online service provided by the online service providing device. For example, the service data storage unit 202 may retain various kinds of tables for managing information relating to the online game, specifically, an event table that manages event information, a score table that manages score information, a player table that manages player information, and the like. The data retained by the service data storage unit 202 is appropriately read/written by the service providing unit 201. In addition, the data retained by the service data storage unit 202 may be referred to for automatic content creation by the content creation unit 203. The service data storage unit 202 may be the above-described auxiliary storage device or an interface with the auxiliary storage device.

The content creation unit 203 may be the above-described processor and memory. The content creation unit 203 reads out the data relating to the online service from the service data storage unit 202, and creates content on the basis of the data. The content creation unit 203 stores the created content in the content storage unit 204.

For example, the content may be a news article on an event relating to the online service. For example, the content creation unit 203 may use a neural network that is mechanically learned to generate a news article from information relating to the online game. In addition, creation of the news article may be performed by setting updating of the service data storage unit 202 as a trigger, or in a periodical manner. For example, the news article may include a banner (may be a link. The same shall apply hereinafter) for access to a headline, an article text, an image, a moving image, a voice, and relating information.

The news article is transmitted from the online service providing device 200 to the content sharing support device 100, and is transmitted from the content sharing support device 100 to the terminal 300. According to this, a user who is not provided with the online service by the online service providing device 200 may be aware of the event relating to the online service and may be interested in the event.

Figure 6:
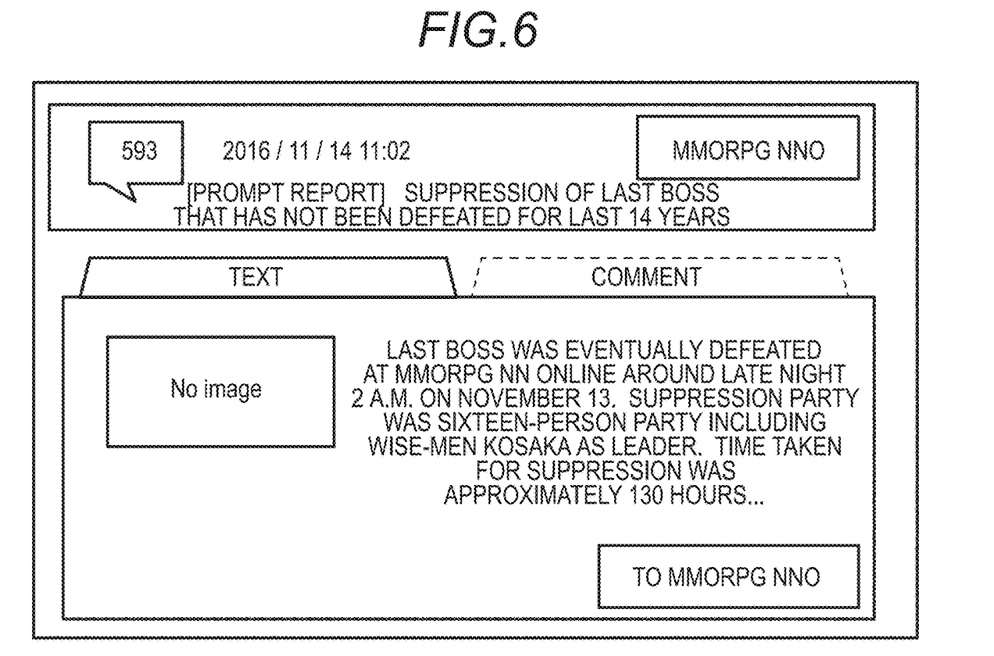
FIG. 6 is a view illustrating news content displayed on a terminal in FIG. 2.
Figure 7:
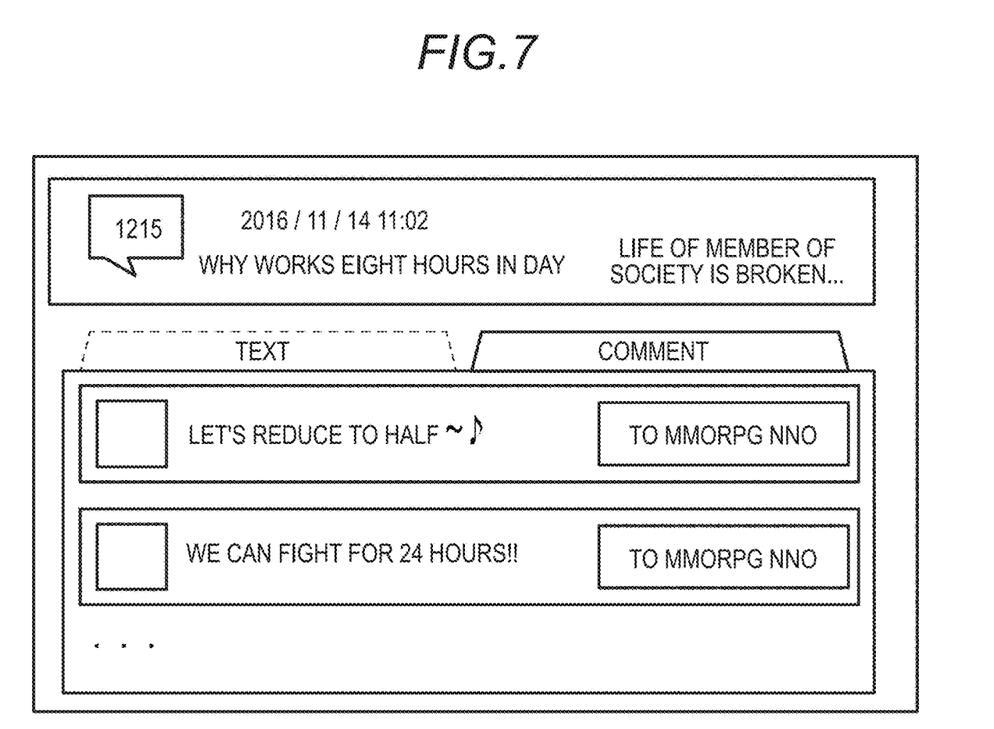
FIG. 7 is a view illustrating news content and a reaction on the news content which are displayed on the terminal in FIG. 2.

A display example of the news article in the terminal 300 is illustrated in FIG. 6 and FIG. 7. The news article in FIG. 6 is a news article that gives a notification of an event in "MMORPG NNO" that is a fictional online game. On the other hand, a news article in FIG. 7 is a real-world news article, and originates from "NN news" that is a fictional online news delivery service provided by the content sharing support device 100.

In the example of FIG. 6, the number of news views, a date, a headline, a source, and the like are displayed in a region of a screen upper portion. Note that, in the example of FIG. 7, since an online service system "NN news" that is a source of the news article is the same as the online service that is currently provided to the terminal 300, display thereof is omitted, but may be displayed.

In the examples of FIG. 6 and FIG. 7, a region of a screen lower portion can display a text tab and a comment tab in a switched manner. When selecting the text tab, as illustrated in FIG. 6, an article text, an image, and a banner to an online service system "MMORPG NNO" that is a source of a news article are displayed in a region of the screen lower portion.

On the other hand, when selecting the commend tab, as illustrated in FIG. 7, an icon of a user who makes a comment, a comment text, and a banner to the online service system "MMORPG NNO" that is a source of the comment, and the like are displayed in a region of the screen lower portion.

For example, the banner to the source of the news article or the comment may be a banner to a portal site of an online service provided by the online service providing device 200, a banner to a sale or download page of an application necessary to receive the online service, or a banner to an entrance page to the online service.

Since the banner exists, the online service providing device 200 can directly invite a user who receives the online service from another online service providing device 200 (or the content sharing support device 100) to an online service thereof.

Note that, addition, correction, deletion (removal), or the like may be performed by human beings with respect to a news article created by the content creation unit 203 as necessary. When human beings create all news articles, the content creation unit 203 is not necessary, but when the content creation unit 203 exists, new article creation load on an online game system side may be reduced.

The content storage unit 204 receives content from the content creation unit 203 and stores the content. In addition, the content storage unit 204 receives content from the content management unit 207, and stores the content. The content may be read out by the content management unit 207 to be transmitted to the content sharing support device 100 or the terminal 400. The content storage unit 204 may be the above-described auxiliary storage device or an interface with the auxiliary storage device.

The acquisition request receiving unit 205 receives an acquisition request for content and/or a reaction from the content sharing support device 100 through a network. The acquisition request receiving unit 205 transmits the acquisition request for content and/or a reaction to the sharing possibility determination unit 206. The acquisition request receiving unit 205 may be the above-described communication device or an interface with the communication device.

The sharing possibility determination unit 206 receives the acquisition request for content and/or a reaction from the acquisition request receiving unit 205, and determines sharing possibility of content and/or a reaction that is a target of the acquisition request. The sharing possibility determination unit 206 may performs the determination of the sharing possibility on the basis of whether or not conditions which are automatically set or arbitrarily set by human beings are satisfied. For example, a user may arbitrarily set whether to permit or reject sharing of content relating to the user (for example, a news article relating to game play by the user, a posted moving image, or the like), or own reaction relating to the content. The sharing possibility determination unit 206 transmits an acquisition request for sharable content to the content management unit 207, and transmits the acquisition request for a sharable reaction to the reaction management unit 213. The sharing possibility determination unit 206 may be the above-described processor and memory.

Note that, in a case where all pieces of content and reactions are set to be sharable, the sharing possibility determination unit 206 is not necessary. In addition, in a case where all reactions of sharable content are set to be sharable, the sharing possibility determination unit 206 may determine only sharing possibility of the content.

The content management unit 207 may be the above-described processor and memory. When receiving the acquisition request for content from the sharing possibility determination unit 206, the content management unit 207 reads out content that is a target of the acquisition request from the content storage unit 204, and transmits the content to the content transmitting unit 208 for transmission to the content sharing support device 100.

When performing the operation, the content created by the content creation unit 203 may be shared by the content sharing support device 100 and/or another online service providing device 200.

In addition, the content management unit 207 receives the content from the content receiving unit 211, and stores the content in the content storage unit 204.

In addition, when receiving the acquisition request for content from the acquisition request receiving unit 209, the content management unit 207 reads out content that is a target of the acquisition request from the content storage unit 204, and transmits the content to the content transmitting unit 210 for transmission to the terminal 400 that is a transmission source of the acquisition request.

When performing the operation, the content originating from the content sharing support device 100 or another online service providing device 200 can be shared by the terminal 400. Note that, this operation may be performed by setting satisfaction of conditions different from reception of the acquisition request as a trigger.

Note that, the content may be set to be sharable by the terminal 400 immediately after the content is created by the content creation unit 203, or the content may be set to be sharable by the terminal 400 after the content is transmitted to the content sharing support device 100, and is transmitted from the content sharing support device 100 to the online service providing device 200.

For example, a screen of an online service provided by the service providing unit 201, for example, a game screen is basically displayed on the terminal 400, and content originating from the content sharing support device 100 or another online service providing device 200, for example, a news article may be additionally displayed in a certain extent that does not hinder the progress of the game. Specifically, the news article may be displayed while waiting for initiation of an in-game event, the news article may be displayed in a matching lobby, or the news article may be displayed when a character operated by a user of the terminal 400 approaches an object such as an in-game display and a bulletin board. When displaying the news article in this manner, it is possible to provide a player of an online game with a communication material. In addition, in terms of a source of the news article, it is possible to enhance a transmission effect of the news article.

Figure 8:
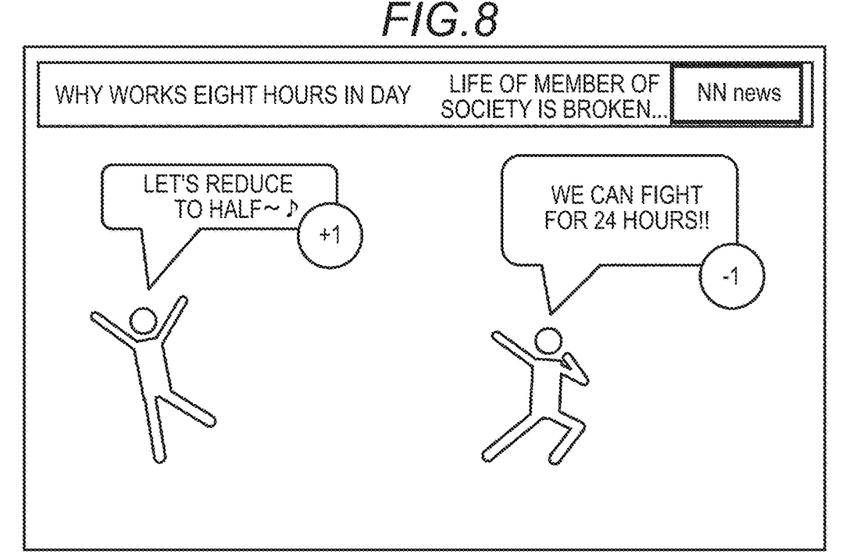
FIG. 8 is a view illustrating news content, a reaction on the news content, and a reaction on the reaction which are displayed on a terminal in FIG. 3.

A display example of a game screen and a news article in the terminal 400 is illustrated in FIG. 8. In an example of FIG. 8, a game image of the above-described "MMORPG NNO" is basically display on the entirety of a screen, and a news article acquired from the content sharing support device 100 is displayed on an upper region of the screen. A headline and a source of the news article, and the like are displayed in the region. In addition, details of a text of the news article and the like may be developed and displayed when a user of the terminal 400 performs a predetermined operation.

In the example of FIG. 8, "let's reduce to the half ~♪ " and "we can fight for 24 hours!!" which are user's comments on the news article are displayed on the screen of the terminal 400, and are transmitted from the online service providing device 200 to the content sharing support device 100 and are also displayed on a screen of the terminal 300 (refer to FIG. 7).

In addition, in the example of FIG. 8, reactions on the comments "let's reduces to the half ~♪ " and "we can fight for 24 hours!!", that is, an expression of a positive position or a negative position is collected from the terminal 300 and/or the terminal 400 which share the comments, the reaction management unit 213 sums up the positions and reflects the positions as a score such as "+1" and "−1". Note that, an expression of the positive position or the negative position may be summed up as an independent score instead of an integral score. In addition, the expression may be displayed with a symbol such as "thumb up" or "thumb down" instead of a numerical value. When a reaction on the reaction is shared between systems, for example, a user of "MMORPG NNO" and a user of "NN news" may perform communication.

The content transmitting unit 208 receives content from the content management unit 207. The content transmitting unit 208 transmits the content to the content sharing support device 100 through a network. The content transmitting unit 208 may be the above-described communication device or an interface with the communication device.

The acquisition request receiving unit 209 receives the acquisition request for content and/or a reaction from the terminal 400 through a network. The acquisition request receiving unit 209 transmits the acquisition request for content to the content management unit 207 and transmits the acquisition request for a reaction to the reaction management unit 213. The acquisition request receiving unit 209 may be the above-described communication device or an interface with the communication device.

The content transmitting unit 210 receives content from the content management unit 207. The content transmitting unit 210 transmits the content to the terminal 400 through a network. The content transmitting unit 210 may be the above-described communication device or an interface with the communication device.

The content receiving unit 211 receives content from the content sharing support device 100 through a network, and transmits the content to the content management unit 207. For example, the content sharing support device 100 may transmit the content to the online service providing device 200 by setting reception of the acquisition request for content transmitted from an acquisition request transmitting unit (not illustrated) of the online service providing device 200 or satisfaction of certain conditions as a trigger. The content receiving unit 211 may be the above-described communication device or an interface with the communication device.

The reaction receiving unit 212 receives a reaction relating to the content from the terminal 400 which transmits the content. The reaction receiving unit 212 transmits the reaction to the reaction management unit 213. The reaction receiving unit 212 may be the above-described communication device or an interface with the communication device.

The reaction management unit 213 may be the above-described processor and memory. The reaction management unit 213 receives the reaction from the reaction receiving unit 212 and stores the reaction in the reaction storage unit 214.

In addition, when receiving the acquisition request for a reaction from the acquisition request receiving unit 209, the reaction management unit 213 reads out a reaction that is a target of the acquisition request from the reaction storage unit 214, and transmits the reaction to the reaction transmitting unit 215 for transmission to the terminal 400 that is a transmission source of the acquisition request.

When performing the operation, the terminal 400 can share the reaction originating from a terminal 300 and/or a terminal 400 which are connected to the content sharing support device 100 and/or another online service providing device 200. Note that, the operation may be performed by setting satisfaction of conditions different from reception of the acquisition request as a trigger.

In addition, when receiving the acquisition request for a reaction from the sharing possibility determination unit 206, the reaction management unit 213 reads out a reaction that is a target of the acquisition request from the reaction storage unit 214, and transmits the reaction to the reaction transmitting unit 216 for transmission to the content sharing support device 100.

When performing the operation, a reaction originating from the terminal 400 connected to the online service providing device 200 can be shared by the terminal 300 and/or the terminal 400 which are connected to the content sharing support device 10 and/or another online service providing device 200. Note that, the operation may be performed by setting satisfaction of conditions different from reception of the acquisition request as a trigger.

The reaction storage unit 214 receives the reaction from the reaction management unit 213 and stores the reaction. The reaction may be read out by the reaction management unit 213 to be transmitted to the content sharing support device 100 or the terminal 400. The reaction storage unit 214 may be the above-described auxiliary storage device or an interface with the auxiliary storage device.

The reaction transmitting unit 215 receives a reaction from the reaction management unit 213. The reaction transmitting unit 215 transmits the reaction to the terminal 400 through a network. The reaction transmitting unit 215 may be the above-described communication device or an interface with the communication device.

The reaction transmitting unit 216 receives a reaction from the reaction management unit 213. The reaction transmitting unit 216 transmits the reaction to the content sharing support device 100 through a network. The reaction transmitting unit 216 may be the above-described communication device or an interface with the communication device.

The reaction receiving unit 217 receives a reaction from the content sharing support device 100 through a network and transmits the reaction to the reaction management unit 213. For example, the content sharing support device 100 may transmit the reaction to the online service providing device 200 by setting reception of the acquisition request for a reaction transmitted from an acquisition request transmitting unit (not illustrated) of the online service providing device 200 or satisfaction of certain conditions as a trigger. The reaction receiving unit 217 may be the above-described communication device or an interface with the communication device.

Next, an operation example of the content sharing support device 100 will be described with reference to FIG. 9.

First, the acquisition request transmitting unit 101 transmits an acquisition request for content to the online service providing device 200 (step S121). In step S121, the content receiving unit 102 receives content from the online service providing device 200 as a response to the transmitted acquisition request, and the content management unit 103 stores the content in the content storage unit 104 (step S122).

The acquisition request receiving unit 106 receives an acquisition request of which a target is the content stored in step S122 (step S125) from the terminal 300. The content management unit 103 reads out the content from the content storage unit 104, and the content transmitting unit 107 transmits the content (step S124).

The reaction receiving unit 108 receives a reaction relating to the content transmitted in step S124 from the terminal 300, and the reaction management unit 109 stores the reaction in the reaction storage unit 110 (step S125).

The reaction management unit 109 reads out the reaction stored in step S125 from the reaction storage unit 110, and the reaction transmitting unit 112 transmits the reaction to the online service providing device 200 (step S126).

Figure 9:
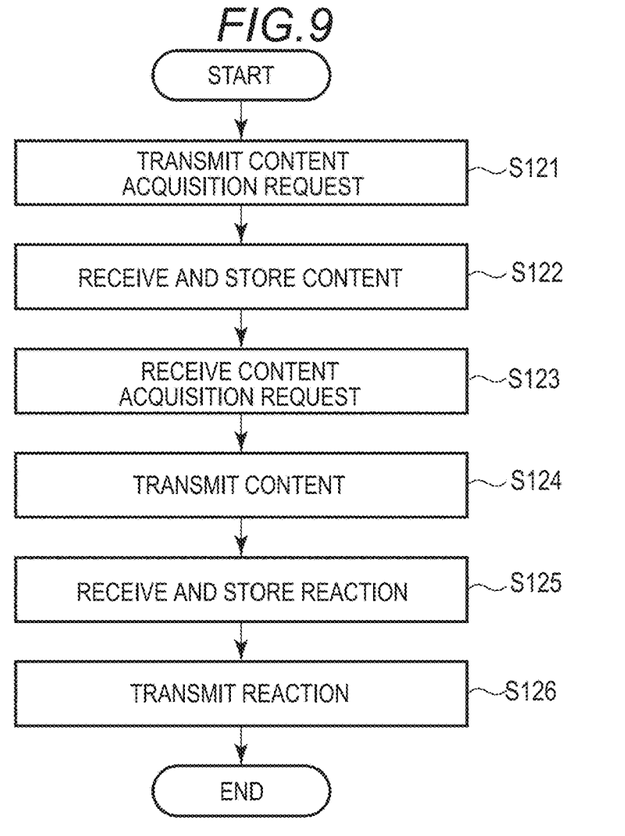
FIG. 9 is a flowchart illustrating an operation of the content sharing support device in FIG. 1.

Note that, FIG. 9 illustrates a series of operations in which the content sharing support device 100 acquires content from the online service providing device 200, the terminal 300 shares the content, a reaction relating to the content is received from the terminal 300, and the reaction is shared by the online service providing device 200. However, the content sharing support device 100 may perform various operations which are not illustrated in FIG. 9.

For example, the content transmitting unit 105 may transmit the content stored in step S122 to the online service providing device 200 that is different from a transmission source of the content.

In addition, the reaction receiving unit 113 may receive the reaction from the online service providing device 200. The content stored in the reaction storage unit 110 may be transmitted to the terminal 300 and/or another online service providing device 200 by the reaction transmitting unit 111 and/or the reaction transmitting unit 112.

Next, an operation example of the online service providing device 200 will be described with reference to FIG. 10.

First, the content creation unit 203 creates content on the basis of data stored in the service data storage unit 202, and stores the content in the content storage unit 204 (step S221).

The acquisition request receiving unit 205 receives an acquisition request for content from the content sharing support device 100 (step S222). The sharing possibility determination unit 206 determines sharing possibility of content that is a target of the acquisition request received in step S222 (step S223). When sharing is possible, the process proceeds to step S224, and when sharing is not possible, the process is terminated.

In step S224, the content management unit 207 reads out content that is a target of the acquisition request received in step S222 from the content storage unit 204, and the content transmitting unit 208 transmits the content to the content sharing support device 100 (step S224).

The reaction receiving unit 217 receives a reaction relating to the content transmitted in step S224 from the content sharing support device 100, and the reaction management unit 213 stores the reaction in the reaction storage unit 214 (step S225). A source of the reaction is the terminal 300 connected to the content sharing support device 100 or the terminal 400 connected to another online service providing device 200.

The acquisition request receiving unit 209 receives an acquisition request for a reaction from the terminal 400 (step S226). The reaction management unit 213 reads out a reaction that is a target of the acquisition request received in step S226 from the reaction storage unit 214, and the reaction transmitting unit 215 transmits the reaction (step S227).

Figure 10:
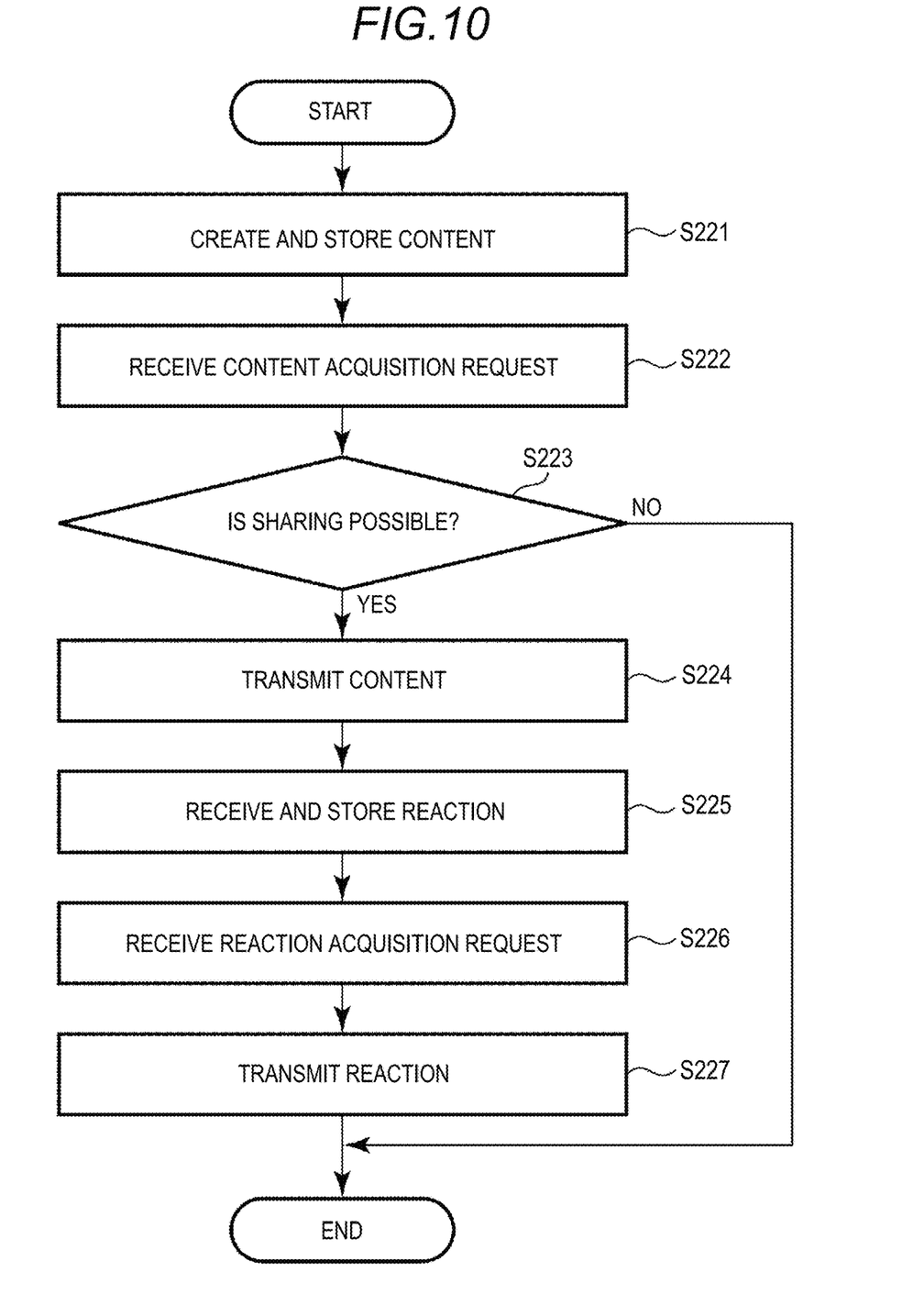
FIG. 10 is a flowchart illustrating an operation of the online service providing device in FIG. 1.

Note that, FIG. 10 illustrates a series of operations in which the online service providing device 200 transmits content created by the online service providing device 200 to the content sharing support device 100 for sharing and receives a reaction relating to the content from the content sharing support device 100, and the terminal 400 shares the reaction relating to the content. However, the online service providing device 200 may perform various operations which are not illustrated in FIG. 10.

For example, the content transmitting unit 210 transmits the content stored in the content storage unit 204 to the terminal 400 in parallel to step S226 to step S227, or before the steps. In addition, the content receiving unit 211 may receive content from the content sharing support device 100. In addition, the reaction receiving unit 212 may receive a reaction from the terminal 400. The reaction stored in the reaction storage unit 214 may be transmitted to the terminal 400 and/or the content sharing support device 100 by the reaction transmitting unit 215 and/or the reaction transmitting unit 216.

As described above, the content sharing support device according to this embodiment receives content from the online service providing device, transmits the content to a terminal that is connected to the content sharing support device, receives a reaction relating to the content, and transmits the reaction to the online service providing device. According to the content sharing support device, content originating from the online service providing device is shared by a terminal that is connected to the content sharing support device, and a reaction relating to the content from the terminal can be shared by a terminal that is connected to the online service providing device.

In addition, the content sharing support device may transmit content received from the online service providing device to another online service providing device. In addition, the content sharing support device may relay a reaction relating to the same content between different online service providing devices. Accordingly, according to the content sharing support device, content originating from the online service providing device is shared by a terminal that is connected to another online service providing device, and terminals connected to both the content sharing support device can share the reaction relating to the content.

The above-described embodiment illustrates a specific example for understanding of the concept of the invention, and is not intended to limit the invention. In the embodiment, addition, deletion (removal), or substitution of various constituent elements may be made in a range not departing from the gist of the invention.

Various functional units described in the embodiment may be realized by using a circuit. The circuit may be a dedicated circuit for realizing specific functions, or may be a general-purpose circuit such as a processor.

At least a part of processes of the embodiment may be realized by using a general-purpose computer as basic hardware. A program for realizing the above-described process may be provided in a state of being stored in a computer-readable recording medium. The program is stored in the recording medium as an installable type file or an executable type file. Examples of the recording medium include a magnetic disk, an optical disc (a CD-ROM, CD-R, a DVD, or the like), a magneto-optical disc (MO or the like), a semiconductor memory, and the like. The recording medium may be any recording medium as long as the recording medium can store a program and can be read by a computer. In addition, the program for realizing the above-described process may be stored in a computer (server) connected to a network such as the Internet, and may be downloaded to the computer (client) through the network.

The invention claimed is:

1. A content sharing support device providing a second online service different from a first online service, the content sharing support device comprising:
a content receiving unit that receives, from an online service providing device, content originating from the first online service, the online service providing device providing the first online service;
a content transmitting unit that transmits, through a network, the content to a first terminal connected to the content sharing support device;
a first reaction receiving unit that receives, from the first terminal, a first user reaction relating to and associated with the content;
a first reaction transmitting unit that transmits the first user reaction to the online service providing device; and
a content storage unit for storing the content received by the content receiving unit and which makes available the content for transmission by the content transmitting unit,
wherein the content sharing support device, the online service providing device, and the first terminal are separate devices.

2. The content sharing support device according to claim 1, further comprising:

a second reaction receiving unit that receives, from the online service providing device, a second user reaction originating from a second terminal and relating to the content; and a second reaction transmitting unit that transmits the second reaction to the first terminal, wherein the content sharing support device, the online service providing device, the first terminal, and the second terminal are separate devices.

3. The content sharing support device according to claim 1, wherein the first reaction is a comment on the content.

4. The content sharing support device according to claim 1, wherein the online service providing device provides a service of an online game to a second terminal connected to the online service providing device, and the content is a news article relating to the online game.

5. A content sharing support device, comprising:

a content receiving unit that receives, from a first online service providing device, content originating from a first online service, the first online service providing device providing the first online service;

a content transmitting unit that transmits, through a network, the content to a second online service providing device that provides a second online service different from the first online service;

a first reaction receiving unit that receives, from the second online service providing device, a first user reaction, which originates from a first terminal connected to the second online service providing device and relates to and is associated with the content;

a first reaction transmitting unit that transmits the first user reaction to the first online service providing device; and a content storage unit for storing the content received by the content receiving unit and which makes available the content for transmission by the content transmitting unit, wherein the content sharing support device, the first online service providing device, the second online service providing device, and the first terminal are separate devices.

6. The content sharing support device according to claim 5, further comprising:

a second reaction receiving unit that receives, from the first online service providing device, a second reaction, which originates from a second terminal connected to the first online service providing device and relates to and is associated with to the content; and a second reaction transmitting unit that transmits the second reaction to the second online service providing device, wherein the content sharing support device, the first online service providing device, the second online service providing device, the first terminal, and the second terminal are separate devices.

7. The content sharing support device according to claim 6, wherein the first online service providing device provides a service of an online game to a second terminal connected to the online service providing device, and the content is a news article relating to the online game.

8. An online service providing device that provides a first online service, the online service providing device comprising:

a first content transmitting unit that transmits content originating from the first online service to a second terminal connected to the online service providing device;

a second content transmitting unit that transmits the content to (1) another online service providing device that provides a second online service different from the first online service, or (2) a content sharing support device that relays the content to the other online service providing device;

a first reaction receiving unit that receives a first reaction relating to the content from the other online service providing device or the content sharing support device; and a first reaction transmitting unit that transmits the first reaction to the second terminal, wherein the first reaction originates from a first terminal connected to the other online service providing device, wherein the content sharing support device, the online service providing device, the other online service providing device, the first terminal, and the second terminal are separate devices.

9. The online service providing device according to claim 8, further comprising:

a second reaction receiving unit that receives a second reaction relating to the content from the second terminal; and a second reaction transmitting unit that transmits the second reaction to the other online service providing device or the content sharing support device.

10. The online service providing device according to claim 8, wherein the first reaction is a comment on the content.

11. The online service providing device according to claim 8, wherein the online service providing device provides a service of an online game to the second terminal, and the content is a news article relating to the online game.

* * * * *